March 11, 1947.  G. R. DOUGLAS  2,417,066
STABILIZING APPARATUS
Filed Aug. 4, 1945  2 Sheets-Sheet 1
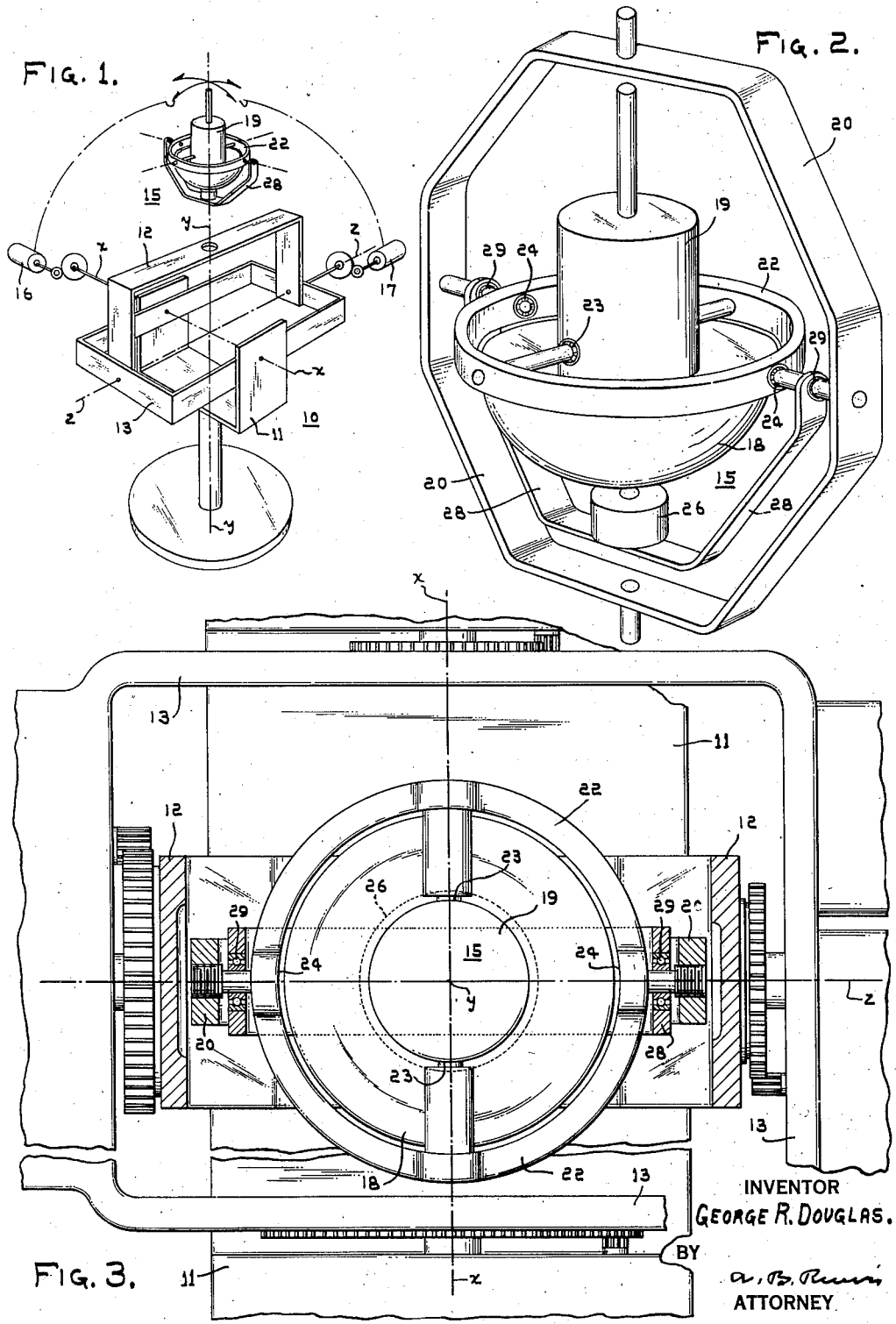
INVENTOR
GEORGE R. DOUGLAS.
BY
ATTORNEY March 11, 1947.

G. R. DOUGLAS 2,417,066

STABILIZING APPARATUS

Filed Aug. 4, 1945

WITNESSES:
J. K. Mosser
H. B. Brown

INVENTOR
GEORGE R. DOUGLAS.
BY
A. B. Reavis
ATTORNEY

Patented Mar. 11, 1947

2,417,066

UNITED STATES PATENT OFFICE 2,417,066

STABILIZING APPARATUS

George R. Douglas, Pittsburgh, Pa., assignor to Westinghouse Electric Corporation, East Pittsburgh, Pa., a corporation of Pennsylvania Application August 4, 1945, Serial No. 608,944

2 Claims. (Cl. 74—5)

The invention relates to stable elements such as disclosed and claimed in the application of Hanna et al., Serial No. 524,560, filed March 1, 1944, and it has for an object to provide apparatus of this character wherein, with the gimbal suspension system of the gyro-vertical rotated slowly about a vertical axis to reduce the effect of or average errors of a mechanical nature arising because of temperature conditions, there is provided a suspension for the erecting magnet which avoids any tendency to self-oscillations, which simplifies the construction as a whole, and which makes the use of damping magnets unnecessary.

In the aforesaid application of Hanna et al., a level or follow-up member is kept horizontal by servo-motor means effective thereon about axes at right angles and controlled by a gyro-vertical. The gyro is neutral or nonpendulous and a universally-mounted magnetic erector is associated therewith to give the spin axis a vertical-seeking tendency. In the application of Lynn Serial No. 607,711, filed July 30, 1945, there is disclosed and claimed an arrangement wherein the gyro and its gimbal system are carried by a frame or cage, which, instead of being attached to the level, is pivotally connected thereto for slow rotation about a substantially vertical axis to average or to reduce the effect of errors arising because of mechanical or thermal reasons. With the frame or cage given slow rotation and with the erecting magnet suspended in a universal manner, self-oscillation of the magnet occurs because it is free to react to the electromagnetic drag which it exerts on the gyro rotor or flywheel structure. This tendency is detrimental and limits the erecting magnet current and, therefore, the erecting time and ultimate accuracy to an extent determined by the efficiency and consistency of devices used to damp oscillations. In accordance with the present invention, instead of having the erecting magnet pendulously suspended in a universal manner, it is supported from the cage or frame for the gyro gimbal system and is pendulous with respect to a single axis, that is, the axis of the pivots for suspending the gyro gimbal system from the frame or cage. With the magnet so suspended, it has freedom of motion and response to gravity only in the plane perpendicular to its suspension axis and it cannot react to the electromagnetic drag and thus pick up energy for self-oscillation from the flywheel or gyro rotor. The improved type of suspension, therefore, makes it possible to increase the erecting torque without regard to self-oscillation, which avoids the necessity for the use of damping devices, and the gimbal construction is simplified in that the additional gimbal mounting for the pendulous magnet is avoided.

A further object of the invention is to provide apparatus of the above character wherein the erecting magnet is pendulously supported for movement about a single axis.

These and other objects are effected by the invention as will be apparent from the following description and claims taken in connection with the accompanying drawings, forming a part of this application, in which:

Fig. 1 is an isometric view showing diagrammatically the stable element to which the invention is applied;

Fig. 2 is an isometric view of the gyro and its erecting magnet;

Fig. 3 is a sectional view taken along the line III—III of Fig. 4; and

Figure 4:
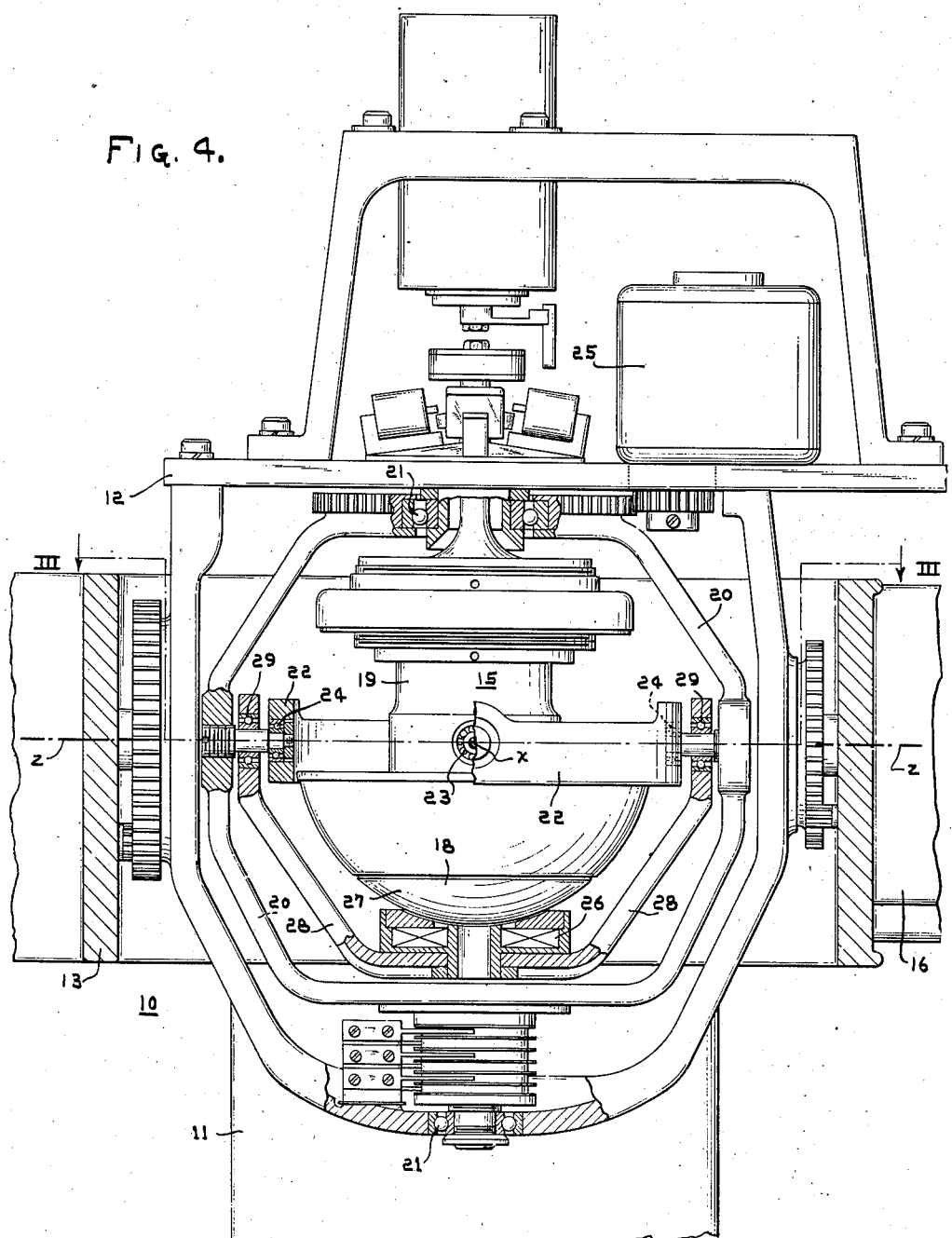
Fig. 4 is a vertical sectional view showing the improved erecting magnet and its mounting in relation to the gyro.

In the drawings, there is shown a stable element, at 10, including a yoke 11 mounted for movement about a train axis $y$—$y$, a level 12, and a cross level 13 pivotally supported by the yoke about the cross level axis $x$—$x$ and pivotally supporting the level 12 about the level axis $z$—$z$.

The level carries a gyro-vertical, at 15, controlling cross level and level servo-motor systems to maintain the level member 12 level or horizontal, the cross level servo-motor system including a motor 16 carried by the yoke and operatively connected to the cross level to move the latter about the axis $x$—$x$ and the level servo-motor system including a motor 17 carried by the cross level and operatively connected to the level to move the latter about the axis $z$—$z$. Thus, irrespective of inclination of the train axis $y$—$y$, the gyro-vertical operates to control the servo-motor systems to effect whatever movements may be necessary about the cross level and level axes to keep the level member level or horizontal, that is, in normal or perpendicular relation to the spin axis of the gyro-vertical.

The gyro-vertical, at 15, includes a rotor 18 journaled in the casing 19, a frame or cage 20 pivotally mounted with respect to the level by means of bearings 21—21 for rotation about a vertical axis and a gimbal suspension for supporting the gyro casing 19 from the cage or frame, the gimbal suspension including a gimbal ring 22, pivots 23 for supporting the casing 19 from the gimbal ring, and pivots 24 for supporting the gimbal ring from the frame or cage 20. A small motor 25 carried by the level 12 slowly rotates the frame or cage 20 about its vertical axis. Preferably, the frame or cage is rotated at a speed of around 10 to 20 R. P. M.

A pendulous erecting magnet 26 cooperates with the spherical element 27 of the rotor to give to the rotor axis a vertical-seeking tendency, as more fully disclosed in the aforesaid application of Hanna et al., in which the magnet is suspended in a universal manner by gimbal means and oscillations thereof are damped magnetically.

Where the frame or cage carrying the gyro gimbal suspension is slowly rotated and a universal or gimbal suspension for the erecting magnet is used, there is a tendency for oscillations of the magnet to be set up because of freedom to react to the electro-magnetic drag exerted thereby on the rotor or flywheel structure. This tendency toward oscillation is detrimental and limits the erecting magnet current, and therefore the erecting time and ultimate accuracy to an extent determined by the efficacy of the devices used to damp the oscillations.

In accordance with the present invention, the above tendency to self-oscillations is avoided by pendulously suspending the erecting magnet about a single axis which revolves with the gimbal system. As shown, the magnet 26 is suspended by a member 28 from the frame or cage 20 by bearings 29—29 for movement about the axis of the supporting pivot bearings 24 for the gimbal ring. Since the magnet has freedom for motion and responds to gravity only in the plane perpendicular to its suspension axis, that is, the axis of the pivots 24, it cannot react to the electromagnetic drag and thus pick up energy for self-oscillation from the flywheel or rotor structure.

While the erecting magnet is pendulously supported for movement about a single axis, nevertheless, as it is rotated with the gimbal system, it is clear that it has the ability to erect the gyro from a tilt in any plane. The erecting effect is, however, not continuous but cyclic and at double the gimbal rotation frequency.

With the improved type of suspension, the erecting torque may be increased without regard to self-oscillation. It is unnecessary to use damping devices to raise the maximum permissible value of the erecting torque. Also, the gimbal construction is simplified in that only a single gimbal suspension is used, the erecting magnet being pendulously supported about one of the axes of the gimbal suspension for the gyro.

While I have shown the invention in but one form, it will be obvious to those skilled in the art that it is not so limited, but is susceptible of various changes and modifications without departing from the spirit thereof.

What is claimed is:

1. In a stable element wherein a follow-up member is maintained substantially horizontal by servo-motor means controlled by a gyro-vertical, a cage mounted on the follow-up member and rotatable about an axis which is vertical when the follow-up member is horizontal, a gimbal system for said gyro-vertical suspended from said cage, means for rotating said cage slowly about its mounting axis, and a pendulous magnetic erector for said gyro-vertical suspended from said cage for pivotal movement about the axis of suspension of the gimbal system.

2. In a stable element wherein a follow-up member is maintained substantially horizontal by servo-motor means controlled by a gyro-vertical, said gyro-vertical comprising a casing, a rotor journaled in a casing, a cage, a gimbal ring, means for pivotally supporting the casing from the gimbal ring about a first axis at right angles to the rotor spin axis, means for pivotally supporting the gimbal ring from the cage about a second axis at right angles both to the first axis and to the rotor spin axis, means for mounting the cage on the follow-up member for movement about a third axis which extends transversely of the first axis and at right angles to the second axis, a pendulous magnetic erector acting on the rotor and pivotally supported from the cage about the second axis, and means carried by the follow-up member for effecting slow rotation of the cage.

GEORGE R. DOUGLAS.

REFERENCES CITED

The following references are of record in the file of this patent:

UNITED STATES PATENTS

| Number | Name | Date |
| --- | --- | --- |
| 1,942,470 | Bassett | Jan. 9, 1934 |

FOREIGN PATENTS

| Number | Country | Date |
| --- | --- | --- |
| 544,756 | Britain | Apr. 27, 1942 |
| 13,280 | Britain | Mar. 13, 1919 |